United States Patent
Zhang et al.

(10) Patent No.: US 10,662,932 B2
(45) Date of Patent: May 26, 2020

(54) PUMP AND A VALVE ASSEMBLY THEREFOR

(71) Applicant: NATIONAL OILWELL VARCO PETROLEUM EQUIPMENT (SHANGHAI) CO., LTD., Shanghai (CN)

(72) Inventors: He Zhang, Shanghai (CN); Mengjin Yu, Shanghai (CN); Mengxi Hu, Shanghai (CN); Ping Jia, Shanghai (CN)

(73) Assignee: National Oilwell Varco Petroleum Equipment (Shanghai) Co., Ltd., Shanghai (CN)

(*) Notice: Subject to any disclaimer, the term of this patent is extended or adjusted under 35 U.S.C. 154(b) by 307 days.

(21) Appl. No.: 15/549,703

(22) PCT Filed: Feb. 13, 2015

(86) PCT No.: PCT/CN2015/072967
§ 371 (c)(1),
(2) Date: Aug. 9, 2017

(87) PCT Pub. No.: WO2016/127383
PCT Pub. Date: Aug. 18, 2016

(65) Prior Publication Data
US 2018/0003314 A1    Jan. 4, 2018

(51) Int. Cl.
*F04B 15/02*    (2006.01)
*F04B 53/10*    (2006.01)
(Continued)

(52) U.S. Cl.
CPC ............. *F04B 15/02* (2013.01); *F04B 53/10* (2013.01); *F04B 53/162* (2013.01); *F16K 31/1221* (2013.01); *F04B 2015/026* (2013.01)

(58) Field of Classification Search
CPC ...... F04B 15/02; F04B 53/10; F04B 53/1025; F04B 53/162; F04B 2015/026; F16K 31/1221
(Continued)

(56) References Cited

U.S. PATENT DOCUMENTS 3,373,695 A * 3/1968 Yohpe ................. F04B 53/1025
                                                                417/569
3,679,332 A * 7/1972 Yohpe ....................... F04B 1/00
                                                                417/503
(Continued)

FOREIGN PATENT DOCUMENTS

CN    103104469 A    5/2013
CN    103104473 A    5/2013

OTHER PUBLICATIONS

International Search Report and Written Opinion dated Nov. 13, 2015 for International Patent Application No. PCT/CN2015/072967, filed on Feb. 13, 2015.

*Primary Examiner* — Kenneth J Hansen
(74) *Attorney, Agent, or Firm* — Amerson Law Firm, PLLC

(57) ABSTRACT

A pump comprises a housing (141) having a cavity (142) with an inlet valve (143), an apparatus (144) for raising fluid pressure in the cavity (142) and a discharge valve (145), the discharge valve (145) comprises a valve head (160) movable between an open and closed position and a valve seat (167), wherein the pump further comprises a booster piston (182) arranged in a booster cylinder (183), the booster piston (182) has a first face (191) exposed to a low pressure zone (189) and a second face (194) exposed to fluid pressure in the cavity (142), and at least one of the booster piston (182) and the booster cylinder (183) is movable relative to the other to add an opening force to the discharge valve. The pump is preferably a mud pump for circulating drilling mud through (Continued)

a drill string in a wellbore or a cement pump which may be of the type for pumping cement into a wellbore. Also disclosed is a method for facilitating opening a valve comprising a valve head (160) and a valve seat (167), the valve head (160) is movable a predetermined distance from a closed position on the valve seat (167) to a fully open position distant on the valve seat, and the method comprises the step of adding a force to the valve head (160) along a small portion of the predetermined distance.

16 Claims, 7 Drawing Sheets

(51) Int. Cl.
*F04B 53/16* (2006.01)
*F16K 31/122* (2006.01)

(58) Field of Classification Search
USPC .................................................. 417/259, 568
See application file for complete search history.

(56) References Cited

U.S. PATENT DOCUMENTS

| | | |
|---|---|---|
| 4,768,933 A | 9/1988 | Stachowiak |
| 2006/0180209 A1 | 8/2006 | Riley et al. |
| 2010/0098568 A1 | 4/2010 | Marica |

\* cited by examiner

PUMP AND A VALVE ASSEMBLY THEREFOR

BACKGROUND

The present invention relates to a pump, a valve assembly for the pump and a method for facilitating opening a valve in a pump. The present invention particularly, but not exclusively relates to a mud pump, cement pump and a method for facilitating opening a discharge valve in a mud pump or cement pump.

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic water or oil-based lubricants and it is normal therefore to recover and re-use the used drilling mud, but this requires inter alia the solids to be removed from the drilling mud. This is achieved by processing the returned drilling mud. The returned drilling mud flows from a wellhead located at a top of the well through a flow line. The first part of the process is to separate the solids from the solids laden drilling mud. This is at least partly achieved by flowing the returned drilling mud on to a screen of a vibratory separator to screen the returned drilling mud of large solids. The screened drilling mud flows into a series of partitioned sections in an active mud tank. Further processing equipment such as centrifuges and hydrocyclones may be used to further clean the mud of solids. Each piece of further processing equipment is located on top of the respective portioned section of the active mud tank, drawing pre-processed mud from the previous portioned section and outputting processed drilling mud into the partitioned section therebelow. The solids are: disposed of; cleaned and used as aggregate or the like; or certain solids, such as Lost Circulation Material is returned to clean drilling mud. It is not uncommon to have 30 to 100 $m^3$ of drilling fluid in circulation in a borehole.

The clean drilling mud is pumped into an additions unit of the active mud tank. Additives, such as weighting agents, viscosity control agents and lost circulation material are added to the clean drilling mud in the additions unit. The prepared drilling mud is now pumped into further testing unit of the active mud system and tested before being pumped into the suction tank of the active mud tank.

A mud pump is then used to pump the prepared and tested drilling mud from the suction tank into a top of the drill string to circulate drilling mud through the drill string to the drill bit and back to the surface through the annulus. The mud pump comprises a pumping section and a power section. The power section may comprise an electric motor, hydraulic motor or the like driving a reciprocating piston in the pumping section. The prepared and tested drilling mud flows from the suction tank through a supply hose or pipe, through an inlet valve in the pumping section of the mud pump into a cavity and is pushed out of the cavity through a discharge valve by action of the reciprocating piston into a further pipe or hose which leads to a goose neck on top of a top drive or swivel and into the top of a string of drill pipe extending into the borehole.

The borehole can be several kilometres long and several kilometres deep, so the mud pump is typically able to discharge drilling mud at between 200 bar and 1000 bar at between 300 and 4800 litres per minute.

The mud pump may comprise dual acting reciprocating pistons or single action. The mud pump may comprise a duplex reciprocating piston, triplex piston, or any other number of pistons. It is advantageous to maintain a constant flow of drilling mud through the drill string at a constant pressure. Surges in the flow of drilling mud and surges in pressure may cause problems downhole. Such problems may include: the constant return of drilled solids; build up of solids in the annulus; maintaining pressure in the well to inhibit collapse of the borehole; and maintaining a constant weight of mud in the well.

The flow of drilling mud through the drill string traditionally stops and starts when a section of drill pipe is added or removed from the string of drill pipe during tripping and drilling. However, continuous circulation systems while tripping and continuous circulation systems while drilling are becoming more popular. With these systems, flow of drilling mud downhole is more continuous and pressure can be maintained at a constant level more easily.

Mud pumps are used on land rigs and offshore rigs. Mud pumps are generally located on or beside a land rig or on an offshore drilling platform. However, the mud pump may be located on the sea bed or between the seabed and a surface of the sea.

In deep wells or wells in formations which may easily collapse, it is common to line the borehole with casing. The casing is hung from a wellhead. Similarly, liner is used to case a borehole, except that the liner is hung from the bottom of an existing casing. The casing or liner is cemented in place by pumping cement down through the casing and up through an annulus between the casing and the borehole. To and bottom plugs are used to facilitate the cementing operation. A cement pump may be used to flow cement into the well and then flow of drilling mud or water behind a bottom plug may be used to push the bottom plug down and force the cement up through the annulus. The mud pump may be used to pump the drilling mud or water behind the bottom plug.

A cement pump may also be used in the general construction industry in pumping cement for: below ground structures, such as foundations; above ground structures such as car parks, housing, commercial buildings and sky scrappers; and in the marine industry in construction above and below water structures, such as quays and oil platforms.

SUMMARY AND STATEMENTS OF INVENTION

The inventors have observed that a build up in pressure in the cavity is required to crack the outlet valve open. This build-up of pressure then normalises to a stable pressure which the pump induces for the stroke of the reciprocating piston in the piston pumping section of the mud pump. The build-up of pressure and then sudden return in pressure to the normalised level creates a shock, which may induce a vibration in the mud pump. The vibration may cause an unwanted noise; may loosen fastenings in the mud pump; and may induce fatigue failure in parts of the mud pump or surrounding components. Furthermore, the inventors have observed that a more consistent pressure in the outlet flow of drilling mud is beneficial for controlling the combined flow once the outlet flows from several pumping sections are combined in a manifold to produce a consistent pressure in the outlet flow of drilling mud from the manifold.

The inventors have observed that a pump requiring having a smoother flow and more consistent pressure in the outlet would also be useful in a cement pump used in the general construction industry.

In accordance with the present invention, there is provided a pump comprising a housing having a cavity with an inlet valve, an apparatus for raising pressure in a fluid in the cavity and a discharge valve, the discharge valve comprising a valve head movable between an open and closed position and a valve seat characterised in that the pump further comprises a booster piston arranged in a booster cylinder, the booster piston having a first face exposed to a low pressure zone and a second face exposed to fluid pressure in the cavity, at least one of the booster piston and booster cylinder movable relative to the other to add an opening force to the outlet valve. Typically, the pressure in the cavity is in the order of 500 bar and the pressure in the low pressure zone is three bar.

Preferably, the pump further comprising a transfer member arranged between the valve head and the booster piston. Preferably, the member is a rod, which may be solid or hollow and of any suitable cross-section, such as circular, square or hexagonal.

Advantageously, the transfer member has a first end and a second end, the first end fixed to the valve head and the second end free. Alternatively, the transfer member has a first and a second end, the first end fixed to the booster and the second end free to selectively abut the valve head. Alternatively, the member has a first and a second end, the first end fixed to the cylinder and the second end free to selectively abut the valve head.

Preferably, the transfer member passes through the cylinder into the low pressure zone and the second end arranged in the path of movement of the booster in the cylinder.

Advantageously, the booster is free floating in the cylinder. Preferably, the booster is free floating between end stops to limit the range of movement of the booster, advantageously between a lip on the end of a cylinder and advantageously, with a hollowed out booster abutting a cylinder head. Advantageously, the range of movement is limited to between 2 mm and 30 mm and preferably, 5 mm to 10 mm.

Preferably, the pump further comprises an inlet for allowing fluid to flow to the inlet valve, wherein the booster cylinder further comprises an opening therein fluidly connected to the inlet to allow fluid in the inlet to flow into and from the low pressure zone in the booster cylinder. It is preferred to use fluid from the inlet to fill the low pressure cavity in the booster piston assembly, so that if there is any leak of fluid from the booster cylinder into the cavity, there will be no contamination. Furthermore, the pressure of the fluid in the inlet is at a suitable pressure, typically three bar. Alternatively, or additionally, the booster cylinder further comprises an opening therein connected to a low pressure source. The low pressure source may be a fluid reservoir open to atmospheric pressure or a bladder open to atmospheric pressure or an accumulator holding the fluid under a low pressure, such as 3 bar. The fluid is preferably water or may be a hydraulic fluid, such as oil.

Preferably, the pump is a mud pump for circulating drilling mud through a drill string in a wellbore and advantageously, the low pressure zone is filled with drilling mud.

Advantageously, the pump is a cement pump for pumping cement or the like. Preferably, for pumping cement into a wellbore in the construction of an oil or gas well, such as for cementing casing in a wellbore.

Preferably, the apparatus for raising pressure in a fluid in the cavity comprises a reciprocating piston. Advantageously, the apparatus for raising pressure in a fluid in the cavity comprises a motor. Preferably, the motor is an electric motor, which may be an AC motor or a DC motor. Advantageously, the motor is a hydraulic motor. Preferably, the motor is a diesel engine. Preferably, the motor drives a crank shaft to reciprocate a piston rod, with a piston head attached thereto.

Advantageously, the apparatus for raising pressure in a fluid in the cavity comprises a hydraulic pump. Preferably, the hydraulic pump comprises a piston and cylinder for reciprocating the reciprocating piston.

Preferably, the valve head of the outlet valve further comprises a spider. Preferably, the spider is arranged on the cavity side of the valve head. Advantageously, the spider comprises a plurality of legs, which may be two, three, four, five or more. Advantageously, the valve seat comprises a portion which extends into the cavity, the spider arranged in the portion of the valve seat. Advantageously, the portion is cylindrical, preferably of circular cross-section, but may be oval, square, pentagonal, hexagonal or have more sides. Preferably, the spider improves flow of fluid through the outlet valve, preferably normalizing the flow and distributing the flow through the valve. Advantageously, the spider guides the outlet valve, holding the valve head and transfer member in axial alignment.

Advantageously, the outlet valve further comprises a spring for biasing the valve head against the valve seat. Preferably, the spring is one of a: coiled spring; Belleville washer; leaf spring; or any other suitable resilient member. Advantageously, a valve stem extending from the valve head. Preferably, the valve stem is arranged in a valve guide.

Preferably, the inlet valve further comprises a valve head and a valve seat and advantageously, a spring for biasing the valve head against the valve seat. Preferably, the spring is one of a: coiled spring; Belleville washer; leaf spring; or any other suitable resilient member. Advantageously, a valve stem extending from the valve head. Preferably, the valve stem is arranged in a valve guide.

The present invention also provides a valve assembly for use in the pump of the invention, the valve assembly comprising a valve head movable between an open and closed position and a valve seat characterised in that the valve assembly further comprises a booster piston arranged in a booster cylinder, at least one of said booster piston and said booster cylinder movable relative to the other to add an opening force to the valve head.

The present invention also provides a method for facilitating opening a valve comprising a valve head and a valve seat, the valve head movable a predetermined distance from a closed position on the valve seat to a fully open position distant to the valve seat, the method comprising the step of adding a force to the valve head along a small portion of the predetermined distance. Preferably, for opening a valve in a pump and most preferably for opening a discharge valve in a pump for pumping drilling mud through a drill string in a wellbore and a cement pump.

Preferably, the small portion is between 1% and 95% of the predetermined distance. Advantageously, the small portion is between 5% and 33% of the predetermined distance.

BRIEF DESCRIPTION OF THE DRAWINGS

For a better understanding of the present invention reference will now be made, by way of example only, to the accompanying drawings, in which.

DETAILED DESCRIPTION

Figure 1:
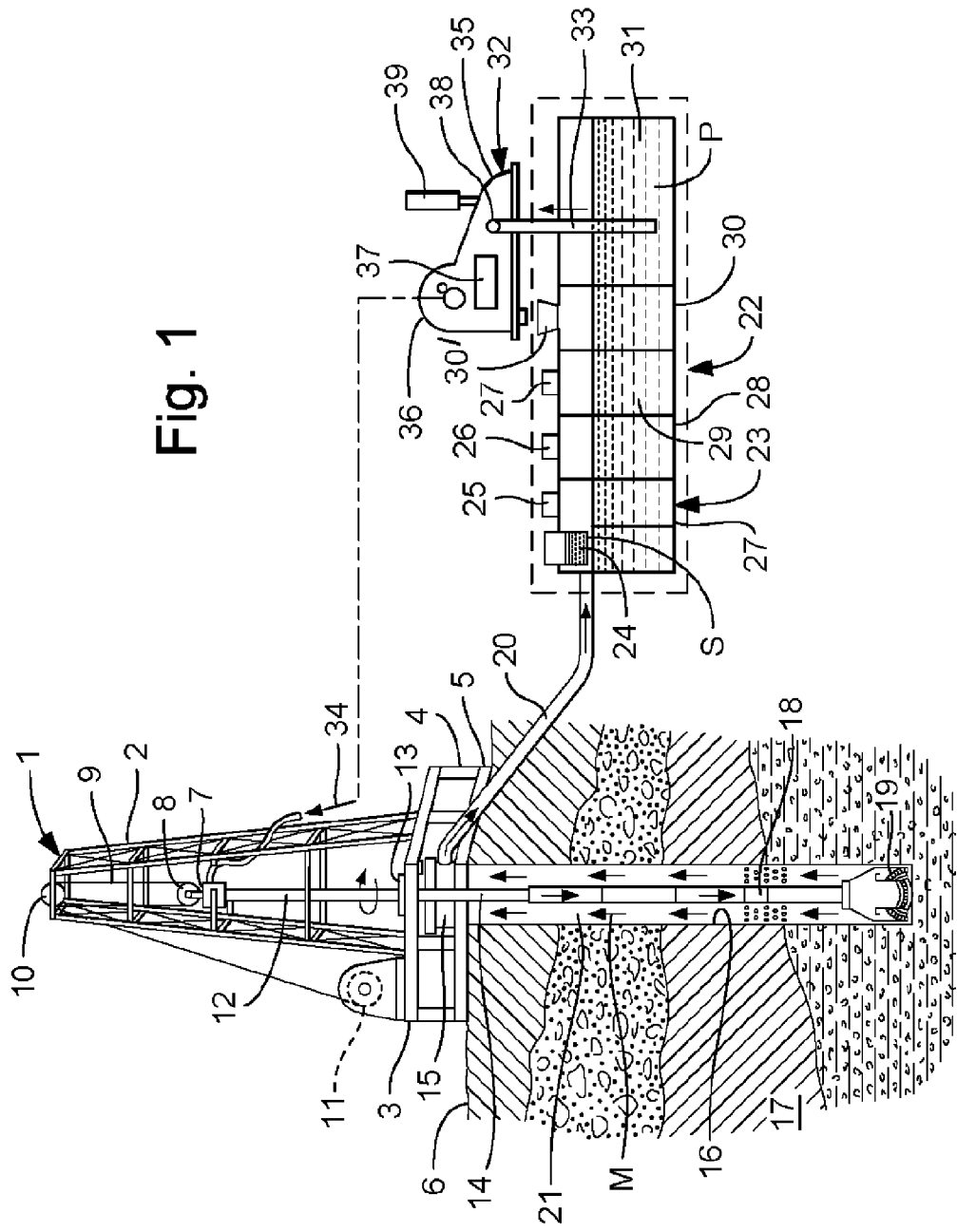
FIG. 1 is a schematic view of a drill rig comprising a mud pump of the invention.

Referring to FIG. 1 there is shown a drilling rig generally identified by reference numeral 1. The drilling rig 1 has a derrick 2 arranged on a drill floor 3 supported on legs 4. The legs 4 are seated on a substructure 5 on ground 6.

A swivel 7 and raised and lowered on a travelling block 8 on wireline 9, which passes over a crown block 10 located at a top of the derrick 2 and down to a drawworks 11 on the rig floor 3. A section of drill pipe 12 depends from the swivel 7, passes through a rotary table 13 and is connected at a lower end to a drill string 14. The drill string 14 passes through a wellhead 15 into a bore hole 16 in formation 17. A bottom hole assembly 18 is arranged on a lower end of the drill string 14, which has a drill bit 19 on the lower end thereof. An annulus 21 is defined between the borehole 16 and the drill string 14.

A flow line 20 is fluidly connected at one end to the annulus 21 at the wellhead 15 and the other end to an active mud system 22. Returned drilling mud M flows from the annulus 21, through wellhead 15, into flow line 20 and to the active mud system 22. The active mud system 22 comprises an active mud tank 23 and a series pieces of mud processing equipment, such as: a shale shaker 24, a degassers 25, a mud conditioner 26, a centrifuge 27. Further mud processing equipment may be used, such as gumbo separators and hydro cyclones. The flow line 20 flows returned drilling mud M directly on to screens of the shale shaker 24. Screened drilling mud S flows from the shale shaker 24 into partitioned section 27. Each piece of further mud processing equipment is located above a partitioned section 27, 28 and 29 of the active mud tank 23, being fed from the previous partitioned section using a small pump and flowing processed drilling mud into the partitioned section 27, 28, 29 therebelow.

The processed drilling mud then passes into additions section 30, into which additives are added, such as bentonite, barite and lost circulation material. The processed and tested drilling mud P is tested and when acceptable, is pumped or allowed to flow into suction tank 31. A mud pump 32 is located downstream of the suction tank 31. The processed and tested drilling mud P flows from the suction tank 31 through a supply hose 33 to the mud pump 32. The processed and tested drilling mud P flows into the mud pump 32 may flow directly from the suction tank 31 down to the mud pump under pressure provided by the head of drilling mud in the suction tank or may be pumped with a small pump to maintain a relatively constant supply pressure which pressure is typically is between 1 to 5 bar and preferably 3 bar. The processed and tested drilling mud P is then pumped by the mud pump 32 through a hose 34 to the swivel 7 where the hose is fluidly connected to a top of the drill pipe 12 and flows through the drill string 14 therefrom.

Figure 4:
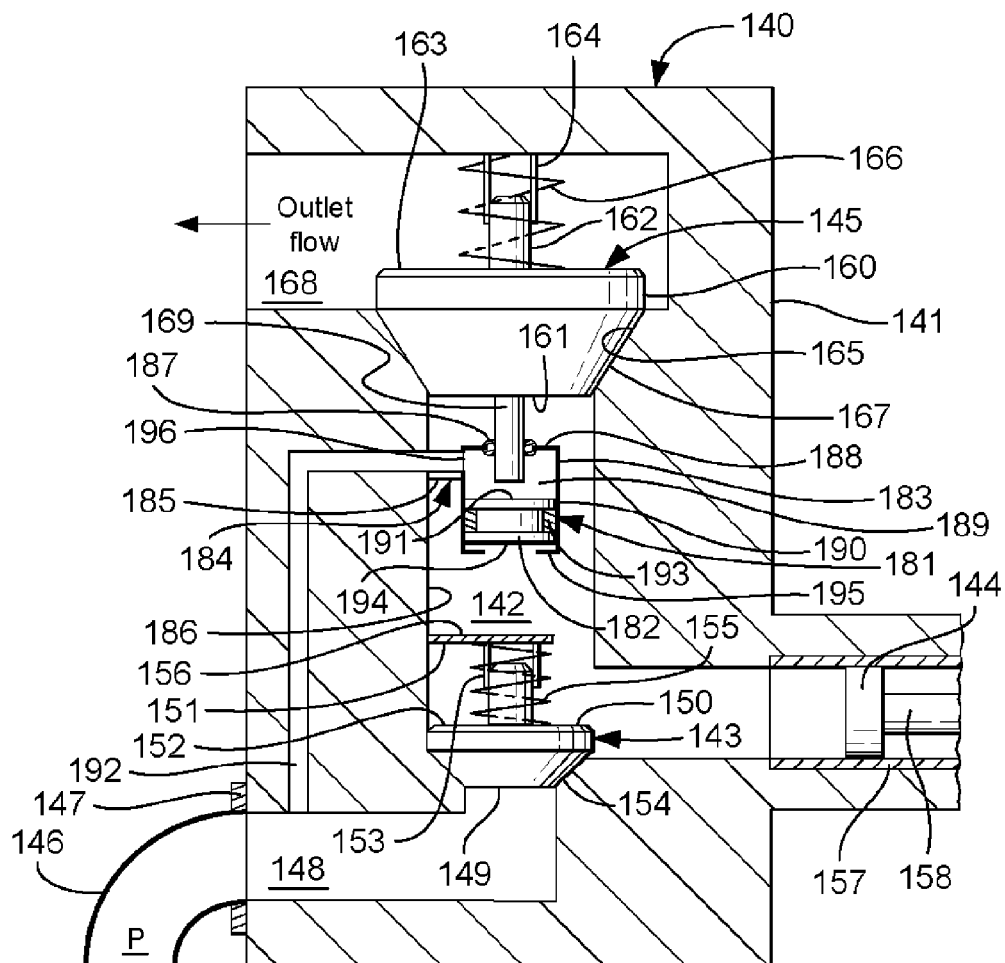
FIG. 4 is a schematic view of a pumping section of a pumping end of a mud pump in accordance with the present invention comprising an inlet valve, a cavity, an outlet valve and booster piston assembly in accordance with the present invention.

The mud pump 32 comprises: a pumping end 35 comprising an inlet manifold 38 and an outlet manifold 39 connected to a number of pumping sections, such as the pumping section shown in FIG. 4; and a power end 36 comprising at least one motor 37 driving piston rods, such as piston rod 158 of the pumping section 140 shown in FIG. 4.

In a top drive rig (not shown) the rotary table is replaced or supplemented by a top drive. In a top drive rig, the hose 34 is connected to a goose neck and rotary connection which is fluidly connected with a quill in the top drive which is in turn selectively connected to the drill pipe 12 and drill string 14.

Figure 2:
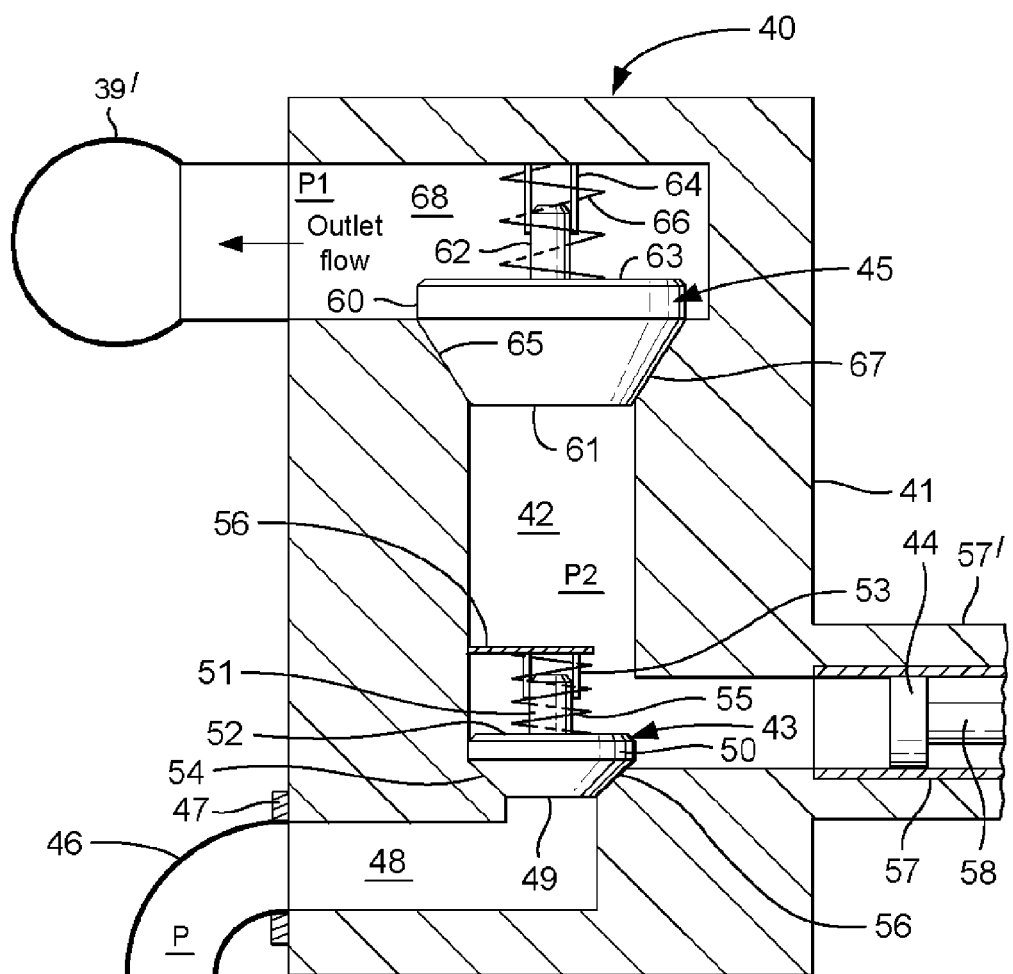
FIG. 2 is a schematic view of a prior art pumping section of a pumping end of a mud pump comprising an inlet valve, a cavity and an outlet valve.

FIG. 2 shows a prior art pumping section of a pumping end of a mud pump, generally identified by reference numeral 40. The pumping section 40 has a valve block 41 with an inlet valve 43, a reciprocating piston 44 and an outlet valve 45 defining a cavity 42. A supply pipe 46 allows drilling mud P to flow from an inlet manifold 38' to an inlet connection 47 in the valve block 41. The inlet manifold 38' receives drilling mud P from a suction tank, like the suction tank 31 shown in FIG. 1. A flow channel 48 in valve block 41 leads to an inlet face 49 of a generally circular valve head 50 of inlet valve 43. The valve head 50 has a valve stem 51 fixed on a rear face 52 of inlet valve 43. The valve stem 51 is slideably arranged in a stem guide 53. The valve head 50 has a frusto-conical outer edge 54. A spring 55 biases the valve head away from a ledge 56, urging frusto-conical outer edge 54 against frusto-conical valve seat 56 of the valve block 41 to form a substantially fluid tight seal therebetween.

The piston 44 is slideably arranged in a cylinder sleeve 57. A piston rod 58 is connected at one end to the piston 44 and at the other to a power end (not shown) of the mud pump. The power end of the mud pump may comprise any suitable means for reciprocating the piston 44, such as a hydraulically driven ram or a motor rotating a crank shaft. Any suitable motor may be used, such as a diesel engine, an electric motor or a hydraulic motor.

An outlet valve 45 comprises a valve head 60 of generally circular shape in plan view, the valve head 60 having an outlet face 61 exposed to the cavity 42. The valve head 60 has rear face 63 to which a valve stem 62 is fixed. The valve stem 62 is slideably arranged in a stem guide 64. The valve head 60 has a frusto-conical outer edge 65. A spring 66 arranged in an outlet passage 68 biases the valve head 60 away from a top portion of the valve block 41, urging frusto-conical outer edge 65 against frusto-conical valve seat 67 of the valve block 41. A discharge passage 68 is provided for conveying flow of drilling mud into a discharge manifold 39'.

Any number of pumping sections 40 are coupled together with the inlet manifold and outlet manifolds (not shown), so that large quantities of drilling mud can be pumped. Any suitable number of pumping sections may be coupled, typically: two, such as with duplex mud pumps; three, such as with triplex mud pumps; or six, as with hex mud pumps; but may be four, five or more. The position of the pistons 44 along each cylinder sleeve 57 may be staggered to obtain a smooth flow of drilling mud through the outlet manifold and into the drill string.

In use, the pumping cycle starts with outlet valve 45 closed and drilling mud P flowing through supply pipe 46 under low pressure (such as 3 bar) being drawn into the cavity 42 by action of the piston 44 retracting, drawing drilling mud P through inlet valve 43. Thus very low pressure in the cavity 42 and the head of drilling mud provided by the level of mud in the suction tank provides sufficient force to open inlet valve 43. Once the reciprocating piston 44 reaches a fully retracted position, the drilling mud P in the cavity 42 is no longer under a very low pressure. The spring force provided by spring 55 overcomes the force on the inlet face 49 of the valve head 50 provided by pressure in the drilling mud in inlet passage 48 moving the valve head to abut valve seat 56 to close the inlet valve 43.

Figure 3:
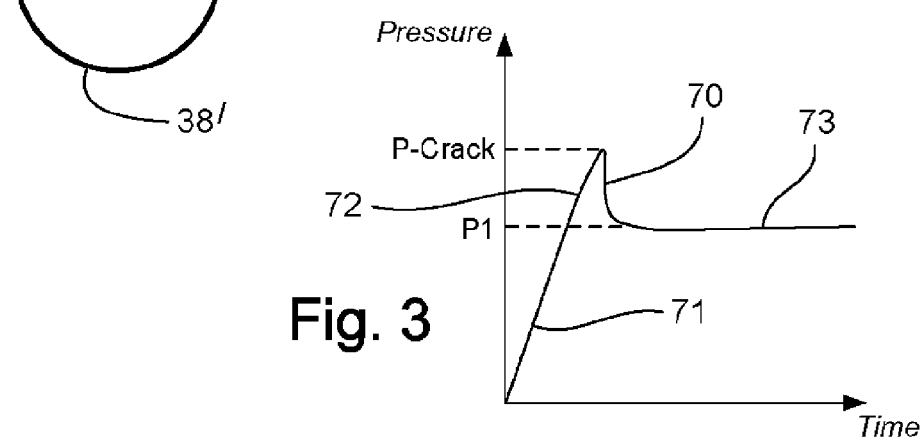
FIG. 3 is a graph showing pressure in the cavity during opening of the outlet valve I'm the pumping section shown in a FIG. 2.

The reciprocating piston 44 is pushed forwards through the cylinder sleeve 57 by the power end moving the piston rod 58, reducing the volume of cavity 42 and pressurising the drilling mud therein, indicated by the steep slope 71 of trace line 70 in the graph in FIG. 3. When the force on outlet face 61 overcomes the force on the rear face 63, the outlet valve 45 should open. The force on the outlet face 61 is provided by the pressure of the drilling fluid over the area of the outlet face 61. The force on the rear face 63 is provided by pressure in drilling mud in the discharge passage 68 over the area of the rear face 63, from spring force supplied by spring 66 and a minimal effect of the weight of the valve head 60 may be taken into consideration. However, the inventors have observed that a large pressure differential across the outlet valve 45 is needed to crack the outlet valve 45 open, as shown in portion 72 of trace line 70 in the graph of FIG. 3. A pressure P-Crack is noted before the outlet valve 45 opens, typically 675 bar. Once the outlet valve 45 is open, the pressure in the drilling mud normalises, indicated by the horizontal portion 73 of the trace line 70 at a pressure P1 in the graph. P1 is the drilling mud pressure required in the outlet flow, which is typically 500 bar, (although may be anywhere between 100 and 2000 bar). Thus P-Crack is typically 20 to 30% higher than the pressure P1. When the force on the rear face 63 of valve head 60 overcomes the force on the outlet face 61 and frusto-conical edge 65 provided by the pressure in the drilling mud in the cavity 42, the outlet valve 45 will close. This will typically occur when the piston 44 reaches the end of its stroke and starts to retract, as the inlet valve 43 begins to open, repeating the pumping cycle.

The inventors noted that the pressure spike P-Crack is seen in both the cavity 42 and the outlet flow, which can induce unwanted vibrations in the mud pump and associated components. The inventors have noted it is beneficial to obtain a constant pressure P1 in the cavity 42 and the outlet passage 68.

Referring to FIG. 4, there is shown a pumping section of the present invention, with similar parts referred to with reference numerals in the one hundred series.

The pumping section 140 has a valve block 141 with an inlet valve 143, a reciprocating piston 144 and an outlet valve 145 defining a cavity 142. A supply pipe 146 allows drilling mud P to flow from the manifold 38 to an inlet connection 147 in the valve block 141. A flow channel 148 leads to an inlet face 149 of a generally circular valve head 150 of inlet valve 43. The valve head 150 has a valve stem 151 fixed on a rear face 152. The valve stem 151 is slideably arranged in a stem guide 153. The valve head 150 has a frusto-conical outer edge 154. A spring 155 biases the valve head 150 away from a ledge 156, urging frusto-conical outer edge 154 against frusto-conical valve seat 156 of the valve block 141.

The piston 144 is slideably arranged in a cylinder sleeve 157. A piston rod 158 is connected at one end to the piston 144 and at the other to a power end (not shown) of the mud pump. The power end may be any suitable power end, such as any discussed herein.

An outlet valve 145 comprises a generally circular valve head 160 having outlet face 161 exposed to the cavity 42. The valve head 160 has a valve stem 162 fixed on a rear face 163 exposed to the outlet flow. The valve stem 162 is slideably arranged in a stein guide 164. The valve head 160 has a frusto-conical outer edge 165. A spring 166 arranged in an outlet passage 168 biases the valve head 160 away from a top portion of the valve block 141, urging frusto-conical outer edge 165 against frusto-conical valve seat 167 of the valve block 141. The valve head 160 moves approximately 30 mm between a closed position and a fully open position. A transfer rod 169 is located substantially concentrically with the valve head 160 fixed and projecting from the outlet face 161. The transfer rod 169 is preferably 30 mm in diameter, although may typically be 10 mm to 75 mm in diameter and extends preferably 75 mm from the outlet face 161 into the cavity 142. The transfer rod 169 is rigid and able to withstand compressive forces so that a force can be applied thereto to push on the valve head 160 to facilitate opening.

The outlet valve 145 is provided with a booster piston assembly generally identified by reference numeral 81 for facilitating the application of an additional force to the valve head 160 to facilitate opening and then preferably, removing the additional force.

The booster piston assembly 181 comprises a booster piston 182 slideably arranged in a cylinder 183. The cylinder 183 is fixed in the cavity 142 in a retainer 184 beneath and concentrically in line with outlet valve head 145. The retainer 184 comprises three arms (only one shown 185), spaced at 120 degrees from each other about the cylinder 183 fixed at one end to the cylinder 183 and at the other to cavity wall 186 of the valve block 141. Three spaces between the three arms 185 allow free flow of drilling mud P through the cavity 142.

The transfer rod 169 passes through a seal 187 in an opening in a cylinder head 188 of the cylinder 183. The transfer rod 169 extends into the cylinder approximately 75 mm. A low pressure zone 189 is defined by the cylinder head 188, cylinder wall 190, an upper face 191 of the piston 182.

The low pressure zone 189 is in fluid communication with drilling mud inlet flow channel 148 via a fluid line 192, so that drilling mud P can flow freely therebetween. The fluid line 192 is of a small diameter, such as 5 mm, but may be any suitable size such as 3 mm to 20 mm. The fluid line 192 may comprise a channel bored through the valve block 141 or any suitable pipe or hose.

The piston 182 has a seal 193 arranged between the upper face 191 and lower face 194, which isolates the cavity 142 from the low pressure zone 189 and allows the piston to slide along the cylinder 183 smoothly. The piston 182 is retained in cylinder 183 by a lip 195. The piston 182 has a range of movement of approximately 2 to 10 mm and may be less than the opening distance of the outlet valve 145. Preferably, no more than 30 percent of the opening distance of the outlet valve 145. Advantageously, the range of movement is between 2 to 5 mm.

An opening 196 in the cylinder is arranged out side of the range of movement of the piston 182, which is fluidly connected to the fluid line 192.

In use, the pumping cycle starts with outlet valve 145 closed and drilling mud P flowing through supply pipe 146 under low pressure (such as 3 bar) being drawn into the cavity 142 by action of the piston 144 retracting, drawing drilling mud P through inlet valve 143. Thus very low pressure in the cavity 142 and the head of drilling mud provided by the level of mud in the suction tank 31 provides sufficient force to open inlet valve1 143. Once the reciprocating piston 144 reaches a fully retracted position, the drilling mud P in the cavity 142 is no longer under a very low pressure. The spring force provided by spring 155 overcomes the force on the inlet face 149 of the valve head 150 provided by pressure in the drilling mud in inlet passage 148 moving the valve head 150 to abut valve seat 156 to close the inlet valve 143.

Figure 5:
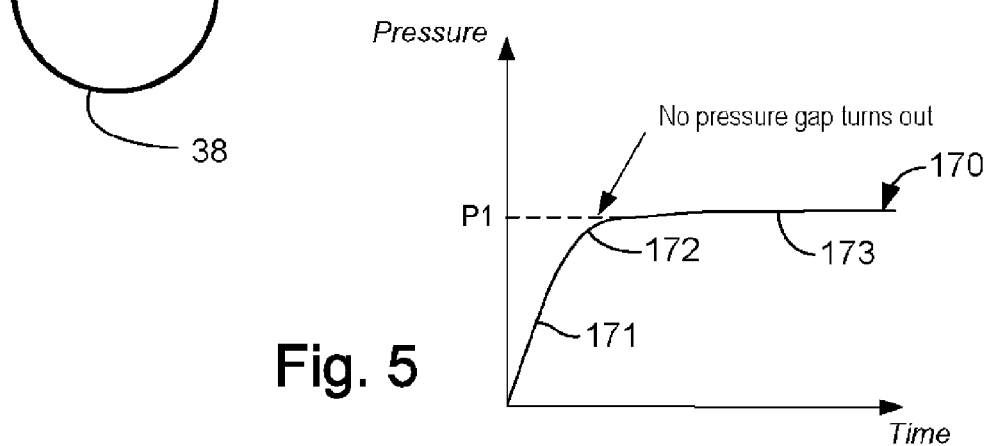
FIG. 5 is a graph showing pressure in the cavity during opening of the outlet valve in the pumping section shown in a FIG. 4.

The reciprocating piston 144 is pushed forwards through the cylinder sleeve 157 by the power end moving the piston rod 158, reducing the volume of cavity 142 and pressurising the drilling mud therein, indicated by the steep slope 171 of trace line 170 in the graph in FIG. 5. When the force on outlet face 161 overcomes the force on the rear face 163, the outlet valve 145 should open. The force on the outlet face 61 is provided by the pressure of the drilling fluid over the area of the outlet face 161 and an additional force is applied to the outlet face 161 by movement of the transfer rod 169. The large pressure, such as 500 bar (but may be 100 to 1000 bar) in the drilling mud in cavity 142 acts on second face 194 of the booster piston 182, which is greater than the force provided by the lower pressure zone (typically 3 bar) acting across the first face 191 of the piston 182. The resultant additive force moves the piston 182 towards an end of the rod 169, expelling low pressure fluid from the low pressure zone 189 through fluid line 192. The piston 182 meets the transfer rod and pushes on the transfer rod 169, applying this additional force to the outlet face 161. The piston 182 moves forward approximately 4 to 10 mm, pushing the valve head 160 open approximately 2 to 8 mm, whereupon the transfer rod 169 leaves the piston 182 and opens to a fully open position after approximately 30 mm of travel. Thus no additional force is applied to the valve head 160 during the final part of the valve head's travel. The valve head 160 begins to unseat itself when the total force on the outlet face is greater than the force on the rear face 163. The force on the rear face 163 is provided by pressure in drilling mud in discharge passage 168 over the area of the rear face 163 and from spring force supplied by spring 166. The additional force applied by the booster piston assembly 181 provides the additional force required to crack the outlet valve open without a large spike in pressure in the drilling mud, as shown by the smooth transition 172 from pressure build up in cavity 142 to the discharge pressure P1 shown by horizontal line 173 in the graph in FIG. 5. Thus the pressure in the cavity 142 is substantially the same as the pressure in the drilling mud in then discharge passage 168 during opening of the discharge valve 145.

Once the outlet valve 145 is open, the pressure in the drilling mud normalises, indicated by the horizontal portion 173 of the trace line 170 at a pressure P1 in the graph. P1 is the drilling mud pressure required in the outlet flow, which is typically 500 bar, (although may be anywhere between 100 and 2000 bar). When the force on the rear face 163 of valve head 160 overcomes the force on the outlet face 161 and frusto-conical edge 165 provided by the pressure in the drilling mud in the cavity 142, the outlet valve 145 will close. This will typically occur when the piston 144 reaches the end of its stroke and starts to retract, as the inlet valve 143 begins to open. The booster piston 182 will fall back on to lip 195, sucking drilling mud in from the inlet 148 into the low pressure zone 189. The pumping cycle then repeats.

Figure 6:
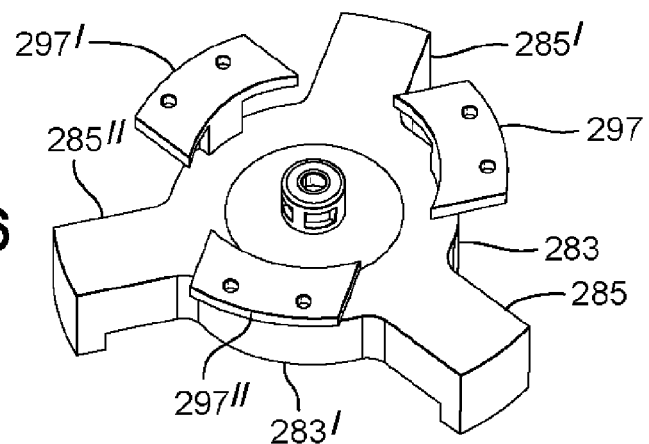
FIG. 6 is a perspective view of part of a booster piston assembly in accordance with the present invention.
Figure 7:
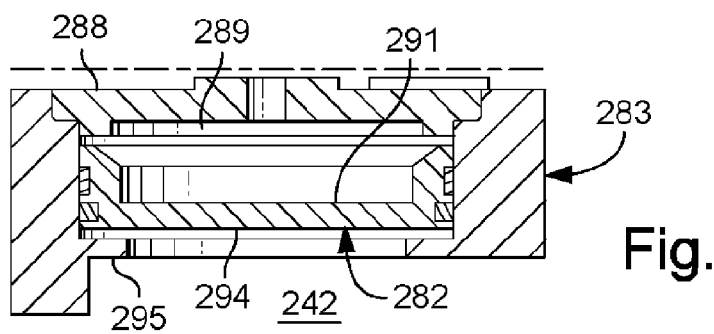
FIG. 7 is a side view in cross-section of a part of the booster piston assembly shown in FIG. 6.
Figure 8:
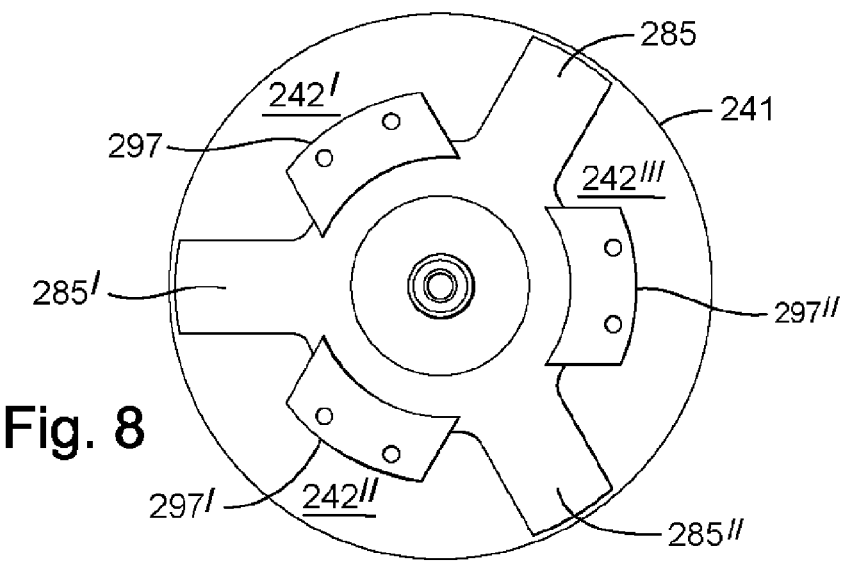
FIG. 8 is a top plan view of part of the booster piston assembly shown in FIG. 6 in a cavity of a pumping section.

A part of a booster piston assembly in accordance with the invention is shown in FIGS. 6, 7 and 8, which is generally similar to the pumping section of FIG. 4, with similar parts referred to with reference numerals in the two hundred series.

A free floating booster piston 282 is slideably arranged in a booster cylinder 283. The booster piston 282 has an upper face 291 exposed to a low pressure zone 289 and a lower face 294 exposed to drill mud pressure in cavity 242. The booster cylinder 283 comprises a lip 295 at a lower end to retain the booster piston 282 in the booster cylinder 283. The booster cylinder 282 comprises a main body 283' with three arms 285, 285' and 285" extending therefrom to a valve body 241 to centralize the main body 283' in the cavity 242. The arms 285, 285' and 285" are spaced about the body at approximately 120 degrees and define flow paths 242' 242" and 242'" through which drill mud can flow. Three raised lugs 297, 297' and 297" are spaced about the main body 283' to rigidly fix the booster piston assembly to the valve block 241.

Figure 9:
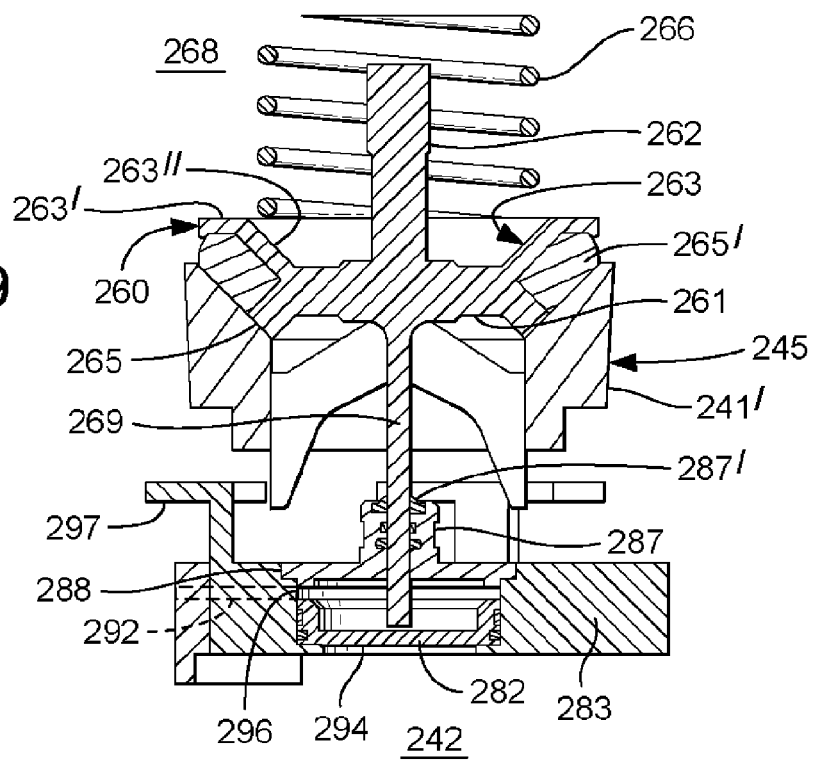
FIG. 9 is a side view of a part of a pumping section in accordance with the present invention in a first stage of use, the pumping section incorporating the booster piston assembly shown in FIG. 6.

Referring to FIG. 9, an outlet valve 245 comprises a generally circular valve head 260 having outlet face 261 exposed to the cavity 242. The valve head 260 has a valve stem 262 fixed on a rear face 263 exposed to the outlet flow. The rear face 263 comprises a planar ring portion 263' and a concave portion 263". The valve stem 262 is slideably arranged in a stem guide (not shown). The valve head 260 has a frusto-conical outer edge 265, with a frusto-conical seal member 265', which may be an elastomeric, machined metal or nylon material. A spring 266 arranged in an outlet passage 268 biases the valve head 260 away from a top portion of the valve block (not shown), urging frusto-conical seal member 265' against frusto-conical valve seat 267 of the valve insert 241' which forms part of or fitted in valve block 241. The valve head 260 moves approximately 30 mm between a closed position and a fully open position. A transfer rod 269 is located substantially concentrically with the valve head 160 fixed and projecting from the outlet face 261. The transfer rod 269 is preferably 15 mm in diameter, although may typically be 10 mm to 75 mm in diameter and extends preferably 75 mm from the outlet face 261 into the cavity 242. The transfer rod 269 is rigid and able to withstand compressive forces so that a force can be applied thereto to push on the valve head 260 to facilitate opening. The transfer rod 269 passes through a seal nipple 287 on cylinder head 288. The seal nipple comprises a cap 287' surrounding the transfer rod 269. The seal nipple 287 also comprises a number of seal elements 287" and guide rings to provide a drilling fluid tight seal about the transfer rod 269, between the cavity 242 and the low pressure zone 289 during a pressure differential of typically 500 bar and may be between 100 bar and 1000 bar.

A spider 298 is rigidly fixed or integral with the outlet valve head 260 and depends therefrom into cavity 242. The spider 298 is slideable with the outlet valve head 260 in a cylinder 241" formed in a lower part of valve insert 241'. The spider comprises four legs 298', 298" and 298'" spaced at 90 degrees about the transfer rod 269. The spider 298 helps hold the outlet valve 245 and the transfer rod 269 centralized during opening and closing. Furthermore, the spider facilitates obtaining a better of flow of drilling mud through the outlet valve 245.

The low pressure zone 289 is defined by the cylinder head 288, cylinder wall 290, upper face 291 of the piston 282. The low pressure zone 289 is in fluid communication with drilling mud inlet flow channel (not shown, but generally similar to flow channel 148) via a fluid line 292, so that drilling mud P can flow freely therebetween at a pressure of approximately three bar.

The piston 282 has a seal 293 arranged between the upper face 291 and lower face 294, which isolates the cavity 242 from the low pressure zone 289 and allows the piston to slide along the cylinder 283 smoothly. The piston 282 has a range of movement of approximately 2 to 10 mm and may be less than the opening distance of the outlet valve 245. Preferably, no more than 30 percent of the opening distance of the outlet valve 245.

Figure 10:
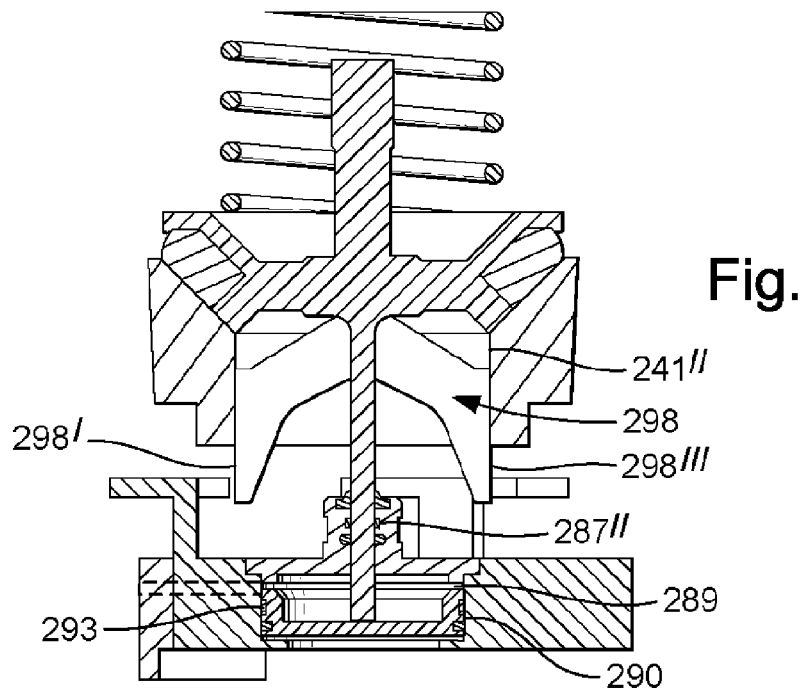
FIG. 10 is a side view of the part of the pumping section shown in FIG. 9 in a second stage of use.
Figure 11:
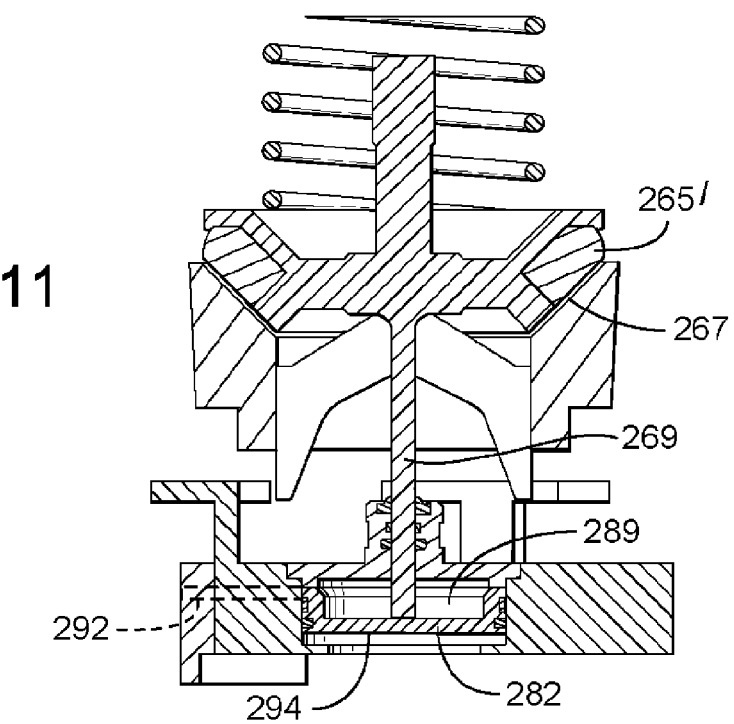
FIG. 11 is a side view of the part of the pumping section shown in FIG. 9 in a third stage of use.
Figure 12:
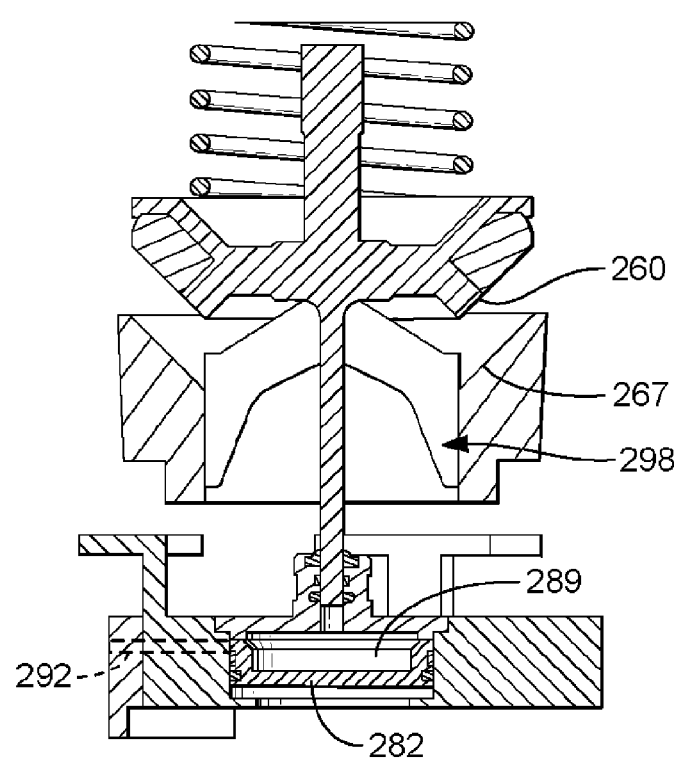
FIG. 12 is a side view of the part of the pumping section shown in FIG. 9 in a fourth stage of use.

In use, the free-floating booster piston 282 initially sits on lip 295 of the cylinder 283, as shown in FIG. 10. As pressure in drilling mud in cavity 242 builds up, the pressure differential across the booster piston 282 moves the booster piston 282 upwards to contact a foot of the transfer rod 269, as shown in FIG. 10. As the pressure in the drilling fluid in cavity 242 reaches the pressure in the drilling fluid in outlet passage 268, an additional force provided by the booster piston 282 on transfer rod 269 facilitates cracking the outlet valve head 260 from the valve seat 267, as shown in FIG. 11. The booster piston 282 may only push the transfer rod 269 2 mm in order to accomplish this. The pressure differential on the outlet valve head 260 and the flow of drilling mud therethrough pushes the outlet valve head 260 open further, whereupon the foot of the transfer rod 269 parts from the upper face 291 of the booster piston 282. The outlet valve head 260 fully opens, which is usually in the order of 30 mm, as shown in FIG. 12.

The opening 296 allowing fluid communication between the low pressure zone 289 and the flow channel (such as 148) through fluid line 292, is covered by the piston 282, although the seals 293 are located in a lower portion of the booster piston 282, so that the seals 293 are prevented from being damaged by the opening 296.

During the part of the mud pump's cycle in which drilling fluid is sucked into the cavity 242, the pressure in the cavity 242 reduces to below the pressure of the fluid pressure in the low pressure zone 289. The free-floating booster piston 282 seats itself on the lip 295. The outlet valve head 260 returns to a closed position with seal 265' seated on valve seat 267.

Figure 13:
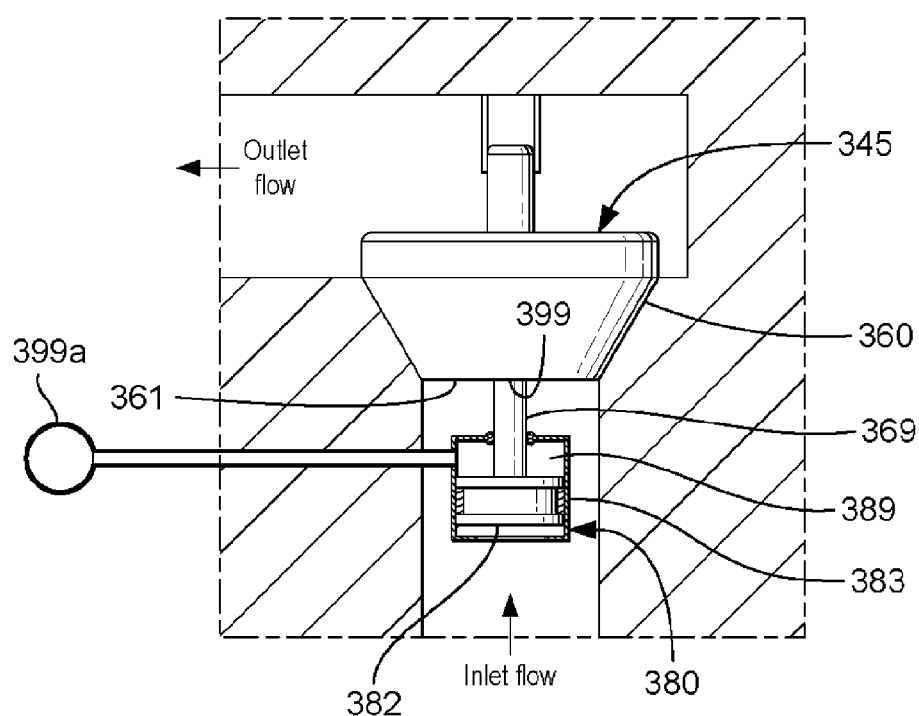
FIG. 13 is a schematic view of a view of part of a pumping section in accordance with the present invention.

Referring to FIG. 13, there is shown a part of a pumping section of the present invention, which is generally similar to the pumping section of FIG. 4, with similar parts referred to with reference numerals in the one hundred series.

There is shown an outlet valve 345 and booster piston assembly 380. The booster piston assembly 380 is generally similar to the booster piston assembly 180, save for the booster piston 382, which has a transfer rod 369 fixed thereto which has a free upper foot 399 which selectively engages lower face 361 of outlet valve head 360. A fluid line 392 is provided with water therein in fluid communication with low pressure zone 389. The water is supplied from a constant pressure source 399a, which may be an accumulator primed to a pressure of preferably 3 bars.

Other alterations and modifications are envisaged, such as using a stationary piston and a moving cylinder for pushing on the valve head.

The invention claimed is:

1. A pump comprising a housing having a cavity with an inlet valve, an apparatus for raising pressure in a fluid in the cavity and a discharge valve, the discharge valve comprising a valve head movable between an open and closed position and a valve seat wherein the pump further comprises a booster piston arranged in a booster cylinder, the booster piston having a first face exposed to a low pressure zone and a second face exposed to fluid pressure in said cavity, at least one of said booster piston and said booster cylinder movable relative to the other to add an opening force to the discharge valve.

2. A pump as claimed in claim 1 further comprising a transfer member arranged between the valve head and the booster piston.

3. A pump as claimed in claim 2 wherein the transfer member has a first end and a second end, the first end fixed to the valve head and the second end free.

4. A pump as claimed in claim 3, wherein the transfer member passes through the cylinder into the low pressure zone and the second end arranged in the path of movement of the booster piston in the cylinder.

5. A pump as claimed in claim 1, wherein the booster piston is free floating in the cylinder.

6. A pump as claimed in claim 1, further comprising an inlet for allowing fluid to flow to the inlet valve, wherein the booster cylinder further comprises an opening therein fluidly connected to the inlet to allow fluid in the inlet to flow into and from the low pressure zone in the booster cylinder.

7. A pump as claimed in claim 1, wherein the booster cylinder further comprises an opening therein connected to a low pressure source.

8. A pump as claimed in claim 1, wherein the pump is for circulating drilling mud through a drill string.

9. A pump as claimed in claim 1, wherein the low pressure zone is filled with drilling mud.

10. A pump as claimed in claim 1, wherein the pump is for pumping cement.

11. A pump as claimed in claim 1, wherein the apparatus for raising pressure in a fluid in the cavity comprises a reciprocating piston.

12. A pump as claimed in claim 1, wherein the apparatus for raising pressure in a fluid in the cavity comprises a motor.

13. A pump as claimed in claim 1, wherein the apparatus for raising pressure in a fluid in the cavity comprises a hydraulic pump.

14. A pump as claimed in claim 1, wherein the valve head of the outlet valve further comprises a spider.

15. A pump as claimed in claim 14, wherein the valve seat comprises a portion which extends therefrom in which the spider is arranged.

16. A pump as claimed in claim 1, wherein the outlet valve further comprises a spring for biasing the valve head against the valve seat.

\* \* \* \* \*